United States Patent
Gutowski

(10) Patent No.: US 7,640,020 B2
(45) Date of Patent: Dec. 29, 2009

(54) METHOD AND APPARATUS FOR ASSIGNING BACKHAUL METHODS

(75) Inventor: Gerald J. Gutowski, Glenview, IL (US)

(73) Assignee: Motorola, Inc., Schaumburg, IL (US)

( * ) Notice: Subject to any disclaimer, the term of this patent is extended or adjusted under 35 U.S.C. 154(b) by 347 days.

(21) Appl. No.: 11/311,518

(22) Filed: Dec. 19, 2005

(65) Prior Publication Data

US 2007/0142064 A1 Jun. 21, 2007

(51) Int. Cl.
H04Q 7/20 (2006.01)

(52) U.S. Cl. .................... 455/452.2; 455/455; 455/445; 370/395.21; 709/223

(58) Field of Classification Search .............. 455/452.2, 455/450, 445; 370/395.21, 232; 709/223
See application file for complete search history.

(56) References Cited

U.S. PATENT DOCUMENTS

| | | | |
|---|---|---|---|
| 6,226,283 B1 | 5/2001 | Neumiller et al. | |
| 6,353,742 B1 | 3/2002 | Bach | |
| 6,400,722 B1 | 6/2002 | Chuah et al. | |
| 7,165,102 B2 * | 1/2007 | Shah et al. | 709/223 |
| 2004/0001442 A1 | 1/2004 | Rayment et al. | |
| 2004/0090312 A1 | 5/2004 | Manis et al. | |
| 2004/0135676 A1 * | 7/2004 | Berkman et al. | 340/310.01 |
| 2004/0208183 A1 * | 10/2004 | Balachandran et al. | 370/395.21 |
| 2004/0218548 A1 * | 11/2004 | Kennedy et al. | 370/254 |
| 2005/0168326 A1 | 8/2005 | White, II et al. | |
| 2005/0169056 A1 | 8/2005 | Berkman et al. | |
| 2006/0148468 A1 * | 7/2006 | Mann | 455/426.1 |
| 2007/0054622 A1 * | 3/2007 | Berkman | 455/67.11 |
| 2007/0076688 A1 * | 4/2007 | Fuss | 370/352 |
| 2008/0037477 A1 * | 2/2008 | Axelsson et al. | 370/338 |

* cited by examiner

Primary Examiner—Danh C Le

(57) ABSTRACT

A method and apparatus is provided for determining which of a plurality of backhaul methods is assigned to a portion of a wireless communication by monitoring at least one quality metric relating to the communication. Then, a backhaul method is assigned according to a predetermined function of the quality metric(s) for at least a portion of the wireless communication from a plurality of available backhaul methods. The quality metric may include any of a variety of indicators, and a default backhaul method may be applied to portions of the wireless communication. These embodiments may be implemented through the use of a wireless communication node including a processor circuit operably coupled to a quality metric sensor and a receiving circuit such that the processor circuit may determine which of the plurality of backhaul pathways should be used to transmit data.

18 Claims, 2 Drawing Sheets

METHOD AND APPARATUS FOR ASSIGNING BACKHAUL METHODS

TECHNICAL FIELD

This invention relates generally to wireless communication systems and more particularly to wireless communication systems having a plurality of available backhaul methods.

BACKGROUND

Various wireless communication systems are known. In many such systems, several nodes within the system act to transmit data between an end user of a wireless communication device and a communication network that can route data from the end user to a final destination and can route data from various network points to the end user. As technologies develop, more options become available for how a node transmits data between an end user and the network. For example, wireless communication systems today typically include a wired connection between a node, such as a base transceiver station or a radio access point, and the communications network. Such wired connections include, for example, a T1/E1 connection.

Newer applications require ever increasing demands on the ability of a communication system to upload data from a wireless communications device for routing through the network. To increase this backhaul capacity, wireless communications systems operators will likely continue to add new connections between certain nodes and the network, including, for example, various 802.16 wireless standard compatible connections and power line transmission connections. The system operators, in the interests of reducing the costs associated with providing the increased backhaul capacities, will need new ways of managing the various available backhaul methods to maximize the usefulness of preexisting backhaul pathways while utilizing newer technologies that provide alternative backhaul pathways.

BRIEF DESCRIPTION OF THE DRAWINGS

The above needs are at least partially met through provision of the method and apparatus for assigning backhaul methods described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments of the present invention. It will further be appreciated that certain actions and/or steps may be described or depicted in a particular order of occurrence while those skilled in the arts will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a method and apparatus is provided for determining which of a plurality of backhaul methods is assigned to at least a portion of a wireless communication by monitoring at least one quality metric as relates to the wireless communication. Then, at a wireless communications node, a backhaul method is assigned according to a predetermined function of the monitored quality metric(s) for at least a portion of the wireless communication from a plurality of backhaul methods available at the wireless communications node. The quality metric may include any of a variety of indicators, and a default backhaul method may be applied to portions of the wireless communication. The invention may be implemented through the use of a wireless communication node including a processor circuit operably coupled to a quality metric sensor circuit and a receiving circuit such that the processor circuit may determine which of the plurality of backhaul pathways should be used to transmit data.

Through the provision of such a method and apparatus, the backhaul capacity of a given wireless system may be increased and efficiently managed such that new backhaul technologies may be implemented to complement existing backhaul methods. Typically, higher capacity backhaul methods can be assigned to portions of a wireless communication needing higher quality service, whereas less critical wireless communications or portions thereof may be assigned to lower capacity or lower quality backhaul methods. In this way, more efficiencies typically can be realized out of the various backhaul methods available to a given wireless communications node.

Figure 1:
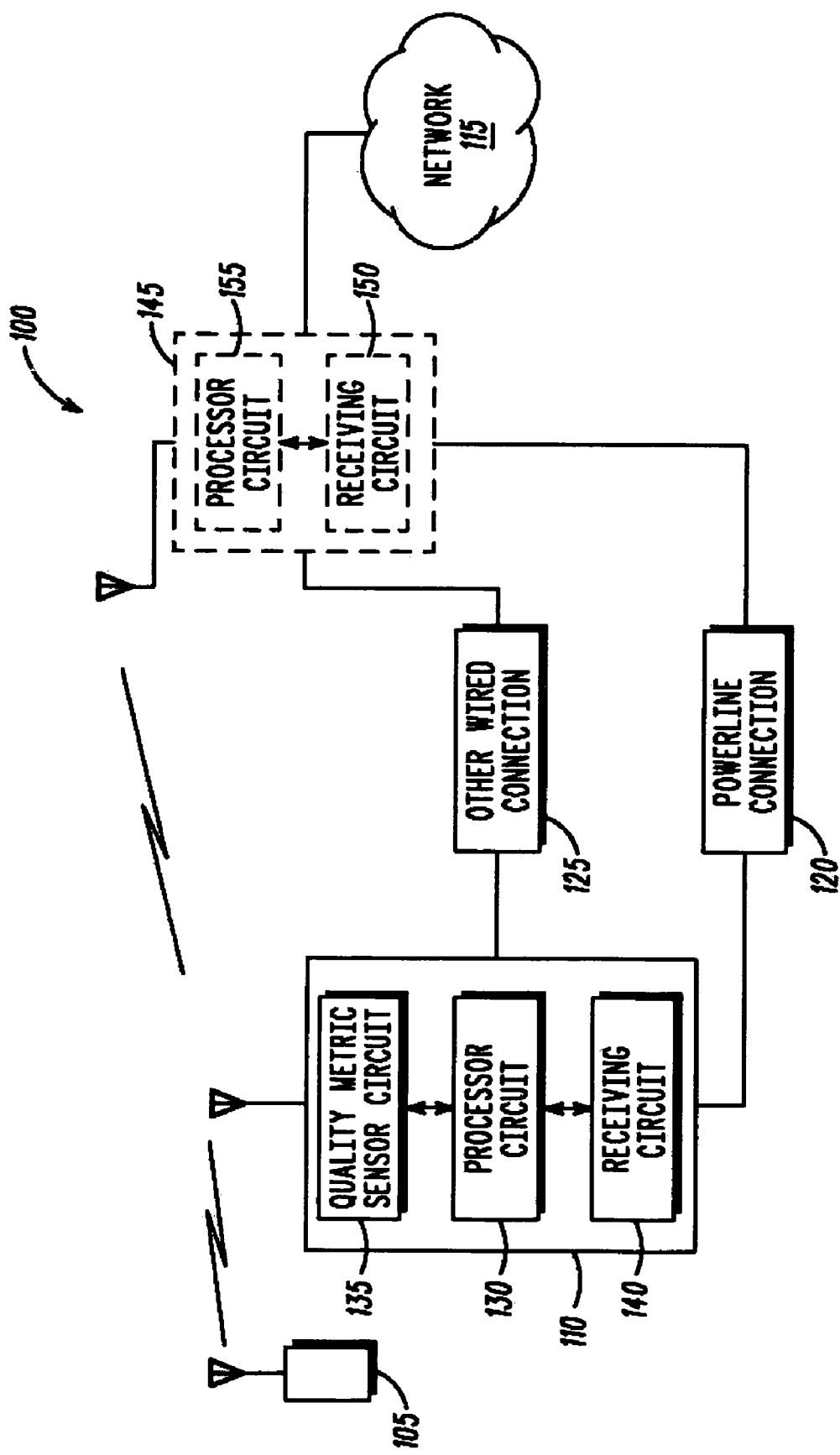
FIG. 1 is a block diagram of a wireless communication system as configured in accordance with various embodiments of the invention.

Referring now to the drawings, and in particular to FIG. 1, portions of a typical wireless communication system 100 are provided including a wireless communication device 105 and a plurality of backhaul pathways from a wireless communication node 110 to a communication network 115. The wireless communication node 110 includes a processor circuit 130 operably coupled to a quality metric sensor circuit 135 and a receiving circuit 140 that receives data. The processor circuit 130 determines which of the plurality of backhaul pathways through which to transmit data.

The plurality of backhaul pathways may include any number of communication pathways including a T1/E1 compatible connection, a wireless compatible connection, a broadband connection, and a powerline connection 120. Wireless compatible connections include, for example, any 802.16 standard compatible connections such as 802.16a, 802.16c, 802.16g, and so forth, 802.11 compatible connections such as 802.11a, 802.11b, and so forth, and other wireless communication capabilities. The powerline connection 120 includes those systems known in the art for transmitting data over power lines. Various other wired connections are represented for clarity at box 125. The other wired connections 125 may include a T1/E1 connection, which is known in the art and will not be further discussed for brevity and clarity. Another wired connection includes a broadband connection, such as a fiber optic connection, that allows high data rate transfer. Such broadband connections are known in the art.

The wireless communication node 110 may be a radio access point or a base transceiver station. Radio access points and base transceiver stations are known in the art. Such structures are common connecting points between one or more wireless communication devices 105 and the network 115. Other structures typically along the pathway between a wireless communication device 105 and the network 115 include base station controllers or other servers that are known and not shown for clarity. These other structures may act as wireless communication nodes within the scope of the invention if the structures possess multiple backhaul pathways from the structure to the network 115. The wireless communication device 105 is any device known in the art for sending data or information wirelessly such as a mobile telephone, mobile computer with wireless capabilities, and so forth.

The wireless communication system 100 may also include a network server or router 145 that includes a network receiving circuit 150 that receives data and is operably coupled to a network processor circuit 155 that assembles data received over the plurality of backhaul pathways. Because the data that make up a wireless communication may arrive at the network server or router 145 through different backhaul pathways, the network receiving circuit 150 and network processor circuit 155 work together to reassemble the data. The network receiving circuit 150 and network processor circuit 155 typically operate in conjunction with certain software elements that are readily available or developable by one skilled in the art. One skilled in the art will also recognize that the various individual circuits, connections, and elements described herein, even when combined as described to form an embodiment of the invention, are readily designed by one skilled in the art and may operate in conjunction with various software elements to perform according to this description.

Figure 2:
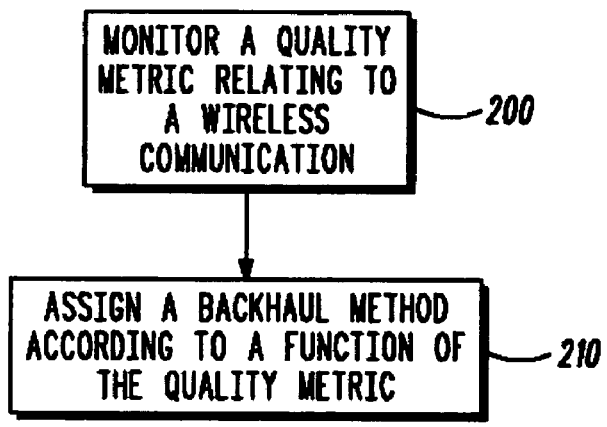
FIG. 2 is a flow diagram as configured in accordance with various embodiments of the invention.

A method of using the above described apparatus will be described with reference to FIG. 2. The quality metric sensor circuit 135 monitors 200 at least one quality metric as relates to a wireless communication. The processor circuit 130 assigns 210 at a wireless communications node 110 and according to a predetermined function of the at least one quality metric, a backhaul method for at least a portion of the wireless communication from a plurality of backhaul methods available at the wireless communications node 110.

The quality metric monitored 200 by the quality metric sensor circuit 135 typically is an indicator either of the quality of one or more links between the wireless communication node 110 and the network 115 or of the quality of connection requested or required by the wireless communication device 105 for the wireless communication. One such quality metric is a service class. In one embodiment, when monitoring a quality metric comprising a service class for a wireless communication, assigning the backhaul method further includes assigning the backhaul method to the wireless communication corresponding to the service class as corresponds to a quality request from the wireless communication device 105. The service class is an indicator of the quality of service requested by the wireless communication device 105 for the given wireless communication. Communicating a service class indication or quality request may be done via a control signal or other way of passing information between the wireless communication device 105 and the wireless communication node 110. The service class will typically be determined at the start of a given wireless communication such that the entire communication will be handled in a consistent manner, typically through a single backhaul method appropriate for that service class.

For example, a wireless communications device 105 sending a live video feed will send a quality request indicating a high level service class such that the quality metric sensor circuit 135 will receive the quality request and interpret the request as indicating a high level service class. Then, the processor circuit 130 will take that service class and assign an appropriate high capacity backhaul method as is available to the wireless communication node 110. For example, the processor circuit 130 may assign a broadband connection or a high capacity wireless connection, such as 806.16g, to the wireless communication. Similarly, if sending, for example, a text message, the wireless communication device 105 will send a quality request for a lower level service class such that the quality metric sensor circuit 135 and the processor circuit 130 will work together as described to assign a lower capacity backhaul method such as a powerline connection 120.

Another embodiment includes monitoring a quality metric comprising a necessary backhaul capacity for a portion of the wireless communication. In this embodiment, assigning the backhaul method further includes assigning a predetermined default backhaul method to the wireless communication when monitoring that the portion of the wireless communication needs less than a predetermined backhaul capacity. In this embodiment, the quality metric sensor circuit 135 monitors the necessary backhaul capacity for portions of the wireless communication received from the wireless communications device 105. For example, a given wireless communication may include text and voice portions. Initially, both portions will be assigned the predetermined default backhaul method, typically a lower bandwidth or lower quality method. In this example, however, the voice portion of the communication may exceed the predetermined backhaul capacity, whereupon the voice portion of the wireless communication may be assigned a higher bandwidth or higher quality backhaul method. The predetermined backhaul capacity values discussed herein will typically be set upon installation or during routine maintenance according to the wireless communication node's 110 available backhaul methods and normal data traffic. Alternatively, the predetermined backhaul capacity may be determined dynamically based upon various factors for the wireless communication node 110.

Typically, the predetermined backhaul method is a preexisting backhaul method, such as one commonly used by a wireless communication system operator prior to the implementation of 3G ("Third Generation") wireless standard communication systems. An example preexisting backhaul method includes a T1/E1 slot. Proper management of such preexisting backhaul methods typically increases the overall backhaul capacity for wireless communication system operators by utilizing the backhaul capacities already in place while expanding capacity through the addition of new technologies.

Yet another embodiment includes monitoring a quality metric comprising a data intensity of a session segment of the wireless communication. In such an embodiment, assigning the backhaul method further includes assigning a lower capacity backhaul method to the session segment when monitoring that the data intensity of the session segment is below a predetermined threshold. A wireless communication is typically divided into various segments necessary to transmit data. Some segments, collectively the control portions of the wireless communication, are typically not data intensive or real-time and therefore may not require high capacity backhaul methods. For example, segments of the wireless communication for signaling, call setup, call teardown, authentication, and so forth will typically have a data intensity below a predetermined threshold and will be assigned a lower capacity backhaul method, for example a powerline backhaul method or other dedicated method, such as a preexisting backhaul method. The predetermined thresholds discussed herein will typically be set upon installation or during routine maintenance according to the wireless communication node's 110 available backhaul methods and normal data traffic. Alternatively, the predetermined threshold may be determined dynamically based upon various factors for the wireless communication node 110. When the quality metric sensor circuit 135 determines that a given session segment has a data intensity exceeding the predetermined threshold, the processor circuit 130 will then assign a higher capacity backhaul method to that given session segment.

Still another embodiment includes monitoring a quality metric comprising a connection identifier for a wireless communication device 105. In such an embodiment, assigning the backhaul method further comprises assigning a higher capacity backhaul method to the wireless communication when monitoring that the connection identifier indicates a premium service for the wireless communication device 105. Here, the quality metric sensor circuit 135 monitors a connection identifier for the wireless communication device 105 as sent by the wireless communications device 105. The connection identifier will indicate whether the wireless communication device 105 is entitled to a particular service quality such that all communications from the wireless communications device 105 will be handled using a given quality of backhaul method. For example, a user may wish to pay a premium to ensure that all communications will be sent using the highest capacity backhaul methods. Thus, when the quality metric sensor circuit 135 determines that such a connection identifier exists for the wireless communication device 105, the processor circuit 130 will assign the appropriate class of backhaul method according to the monitored connection identifier.

Another embodiment monitors a quality metric comprising a data rate for a wireless communication device. In this embodiment, assigning the backhaul method includes assigning a predetermined backhaul method for the portion of the wireless communication according to a predetermined data rate table. The data rate is a measure of the rate data passes either between the wireless communication device 105 and the wireless communication node 110 or the wireless communication node 110 and the network server or router 145. The quality metric sensor circuit 135 may monitor the data rate by monitoring the data downloading rate between the two elements and/or one or more quality of service factors regarding the radio link between the two elements. Monitoring a quality of service factor can be accomplished in a number of known ways including, for example, sensing the strength of signal between the elements, monitoring the forward error correction ("FEC") or bit error rate of data passed between the elements, and so forth. The processor circuit 130 uses the monitored data rate and available bandwidth to compare to a lookup table to decide which of the available backhaul methods to assign. The predetermined backhaul method will typically be set upon installation or during routine maintenance according to the wireless communication node's 110 available backhaul methods and normal data traffic. Alternatively, the predetermined backhaul method may be determined dynamically based upon various factors for the wireless communication node 110.

A further embodiment monitors a quality metric comprising a payload for the portion of the wireless communication. In this embodiment, assigning the backhaul method further includes assigning a higher capacity backhaul method to the portion of the wireless communication when monitoring that the payload is greater than a predetermined threshold. The payload relates to the size of a packet of data in the wireless communication. Packets typically range in size from 1500 bytes to 9000 bytes. The quality metric sensor circuit 135 in this embodiment monitors the payload or size of each packet of data, typically by reading the header data for the packet, and in response, the processor circuit 130 assigns a backhaul method corresponding to the size of the packet. For example, in one possible embodiment, if the quality metric sensor circuit 135 monitors a packet larger than a predetermined threshold of 5000 bytes, the processor circuit 130 will assign a broadband connection or high speed wireless connection to the packet as its backhaul method.

To implement the embodiment that monitors a payload, fast switching technologies such as ultra high-speed optical fiber switch technology, as is common in the art, provides an outbound and inbound high-speed transport fabric to de-multiplex and multiplex data packet payloads split over heterogeneous backhaul schemes. To accomplish the segmentation and concatenation of the payloads, cooperation of the multiplexing layer is typically required. Many systems in the art, such as GSM LAPDm, employ such schemes but they do not anticipate transfers over different layer 1 link protocols. Therefore, providing the preferred set of heterogeneous backhaul technologies serves to configure protocol fields, indicate backhaul technologies in use, provide additional data indication fields, provide end of transmission signals, or continue transmission fields. Packet sequence numbers are often required to enable the concatenation algorithm to re-assemble the technology segmented backhaul set. Further, the implementation of the aggregation algorithm may be realized in JAVA virtual machines, FPGA circuits, and ASIC circuits. The speed of the switching fabric and in combination with the aggregator algorithm provides a new degree of dynamic control whereby an immediate response by the wireless communication system 100 thereby enhances the management and use of the backhaul methods available such that the total bandwidth of the system may be improved. For instance, by assigning higher capacity backhaul methods to larger capacity payloads, the payloads move through the system faster and do not choke off lesser capacity backhaul methods.

In yet a further embodiment, monitoring a quality metric further includes monitoring for a change in at least one transmission characteristic for the wireless communication. In this embodiment, assigning the backhaul method further includes changing an assigned backhaul method for the wireless communication when monitoring that the transmission characteristics for the wireless communication has changed past a predetermined threshold. Here, the quality metric sensor circuit 135 will monitor one or more transmission characteristics for changes that make changing the assignment of the backhaul method more advantageous. The transmission characteristics typically monitored in such an embodiment include the connection identification, the service class, and the types of available backhaul methods.

In one example of this embodiment, the quality metric sensor circuit 135 monitors the service class for the wireless communication. The requested service class may change during the communication if the use of the wireless communication device 105 changes. For example, during a voice conversation, the user may choose to transfer a video or movie. In this case, the service class for the voice conversation portion may trigger an assignment of a mid-range capacity backhaul method from the processor circuit 130 such as a wireless oriented backhaul with a channel bandwidth, code rate, and modulation scheme that supports uplink transfer (for example at 3.0 Mbps-15 Mbps: 802.16e-5 Mhz channel, 16 QAM, 3/4 coding book rate) from the wireless device 105 to the wireless communication node 110 or a similar wireless backhaul configuration. Whereas when the service class changes with the start of the video transfer, the processor circuit may assign a high-end backhaul method such as a broadband connection. In another example, if the quality metric sensor circuit 135 senses a change in the available backhaul methods, the processor circuit 130 can change the assignment of the backhaul methods accordingly.

Figure 3:
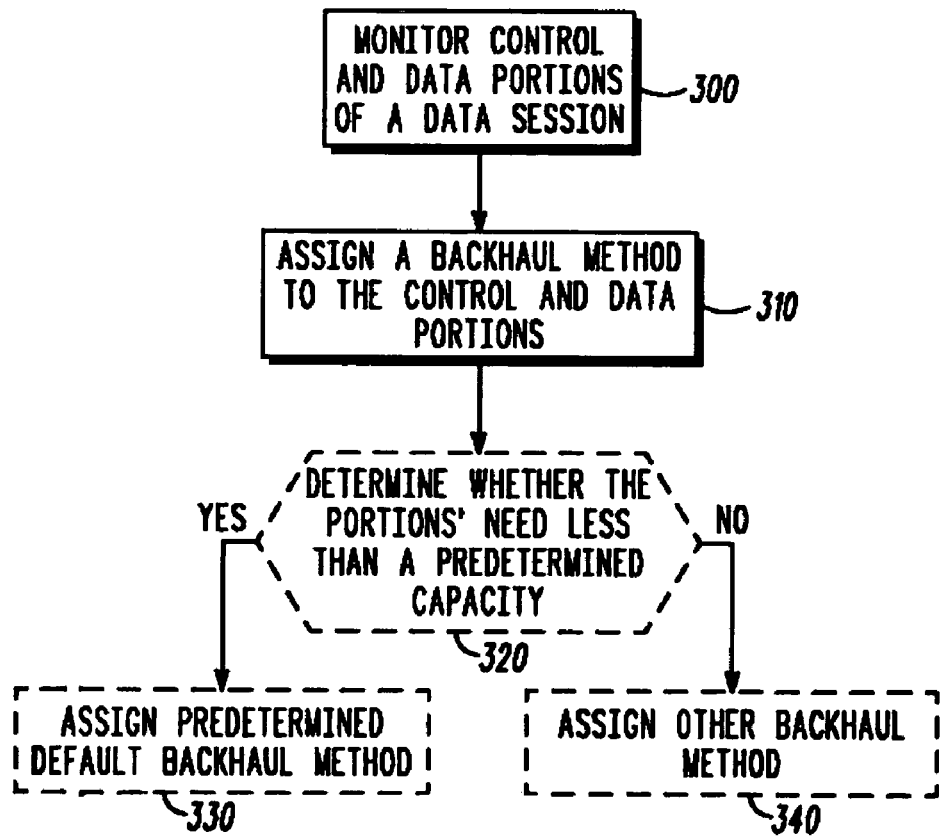
FIG. 3 is a flow diagram as configured in accordance with various embodiments of the invention.

In an alternative embodiment described with reference to FIG. 3, a portion of the wireless communication node 110 will monitor 300 control and data portions of a data session as relates to a wireless communication. In response, the processor circuit 130 assigns 310 at the wireless communication node 110, in association with each portion of the data session, backhaul methods for the control and data portions of the wireless communication from a plurality of backhaul methods available at the wireless communication node 110. Typically, the control and data portions of a wireless communication have different bandwidth needs. For example, the data portion of a wireless communication may be very large or need to be transmitted at a certain higher quality level, whereas the control portion may be much smaller relative to the data portion and thus not need a high bandwidth backhaul method. Thus, assigning the control portion to a low capacity backhaul method and assigning the data portion to a high capacity backhaul method typically improves the efficiency of use of the available backhaul methods.

Similar to the other above described embodiments, the data and control portions of a wireless communication may be monitored against a predetermined threshold to help assign backhaul methods to the portions. Alternatively, the processor circuit 130 may determine 320 that the portions need less than a predetermined backhaul capacity and assign 330 predetermined backhaul methods to the portions of the data session having a backhaul capacity suitable for the portions of the data session. Otherwise, the processor circuit 130 assigns 340 another backhaul method when determining 320 that the portions do not need less than the predetermined capacity. In this way, an appropriate backhaul method, such as a low capacity backhaul for the control portion and a mid-level capacity backhaul for the data portion, is a default for the portions unless a portion of a communication needs a higher capacity. If, for example, the quality metric sensor circuit 135 monitors that a data portion includes an amount of data over a predetermined amount, then the processor circuit 130 will assign a high capacity backhaul method to the data portion.

By monitoring the various parts and metrics relating to a wireless communication, the above described algorithms will typically assign optimum backhaul methods to improve the overall backhaul bandwidth for the wireless communication node 110. Further, the system provides alternative options for users of the system to request certain capabilities. Thus, wireless communication system operators will continue to fully utilize existing backhaul methods while adding additional backhaul methods to their systems as new technologies develop.

Those skilled in the art will recognize that a wide variety of modifications, alterations, and combinations can be made with respect to the above described embodiments without departing from the spirit and scope of the invention. For example, several quality metrics may be monitored and considered when assigning a backhaul method. The metrics may be ranked such that the backhaul assignment indicated by one metric may override the assignment indicated by another. Alternatively, the metrics may be considered together when assigning backhaul methods. In another alternative, the metrics may be considered temporally in a different fashion over the course of a day, for example during busy hours, to better model anticipated load requirements of the changing population density of wireless devices when assigning backhaul methods. In still another alternative, the metric may be combined for a carrier to interface with a metric analyzing the availability of licensed versus unlicensed channels for wireless backhaul during peak load times may also be employed in selecting a backhaul method. Such modifications, alterations, and combinations are to be viewed as being within the ambit of the inventive concept.

I claim:

1. A method comprising:
    monitoring at least one quality metric related to a wireless communication over a wireless communication link;
    assigning by a wireless communications node, according to a predetermined function of the at least one quality metric, a backhaul method over a different communication link for at least a portion of the wireless communication from a plurality of backhaul methods available at the wireless communications node; and
    wherein when monitoring a quality metric comprising a service class for a wireless communication, assigning the backhaul method further comprises assigning the backhaul method corresponding to a service class as corresponds to a quality indication received from the wireless communication device.

2. The method of claim 1 wherein the plurality of backhaul methods comprise at least two from a group comprising: a T1/E1 compatible connection; a broadband connection, a wireless compatible connection; and a powerline connection.

3. The method of claim 1 wherein when monitoring a quality metric comprising a necessary backhaul capacity for the portion of the wireless communication, assigning the backhaul method further comprises assigning a predetermined default backhaul method to the wireless communication when monitoring that the portion of the wireless communication needs less than a predetermined backhaul capacity.

4. The method of claim 3 wherein the predetermined backhaul method further comprises a preexisting backhaul method.

5. The method of claim 4 wherein the preexisting backhaul method further comprises a T1/E1 slot.

6. The method of claim 1 wherein when monitoring a quality metric comprising a data intensity of a session segment of the wireless communication, assigning a lower capacity backhaul method to the session segment when monitoring that the data intensity of the session segment is below a predetermined threshold.

7. The method of claim 6 wherein the lower capacity backhaul method further comprises at least one from a group comprising a powerline backhaul method and a preexisting backhaul method.

8. The method of claim 1 wherein when monitoring a quality metric comprising a connection identifier for a wireless communication device, assigning the backhaul method further comprises assigning a higher capacity backhaul method to the wireless communication when monitoring that the connection identifier indicates a premium service for the wireless communication device.

9. The method of claim 1 wherein when monitoring a quality metric comprising a data rate for a wireless communication device, assigning the backhaul method further comprises assigning a predetermined backhaul method for the portion of the wireless communication according to a predetermined data rate table.

10. The method of claim 9 wherein monitoring a quality metric comprising the data rate further comprises at least one of a group comprising monitoring a data downloading rate and monitoring a quality of service factor.

11. The method of claim 1 wherein when monitoring a quality metric comprising a payload for the portion of the wireless communication, assigning the backhaul method further comprises assigning a higher capacity backhaul method to the portion of the wireless communication when monitoring that the payload is greater than a predetermined threshold.

12. The method of claim 1 wherein when monitoring a quality metric further comprises monitoring for a change in at least one transmission characteristic for the wireless communication, assigning the backhaul method further comprises changing an assigned backhaul method for the wireless communication when monitoring that the transmission characteristic for the wireless communication has changed past a predetermined threshold.

13. The method of claim 12 wherein the change in transmission characteristics further comprises at least one from a group comprising: a change in connection identification, a change in service class, and a change in available backhaul methods.

14. An apparatus comprising:
a plurality of backhaul pathways from a wireless communication node to a communication network;
the wireless communication node comprising a processor circuit operably coupled to a quality metric sensor circuit and a receiving circuit that receives data, and the processor circuit that determines which of the plurality of backhaul pathways through which to transmit the data based on at least one quality metric associated with a wireless communication with a mobile wireless communication device and monitored by the quality metric sensor; and
a network receiving circuit that receives data operably coupled to a network processor circuit that assembles data received over the plurality of backhaul pathways.

15. The apparatus of claim 14 wherein the plurality of backhaul pathways further comprises at least two from a group comprising: a T1/E1 compatible connection; wireless compatible connection; a broadband connection; and a powerline connection.

16. The apparatus of claim 14 wherein the wireless communication node further comprises at least one of the group comprising: a radio access point and a base transceiver station.

17. A method comprising:
monitoring at least one quality metric associated with a wireless communication with a mobile wireless communication device over a wireless communication link;
selecting, by a wireless communications node based on the at least one quality metric, a backhaul pathway for at least a portion of the wireless communication from among a plurality of backhaul pathways available at the wireless communications node; and
wherein monitoring comprises receiving an indication of a quality of connection from a wireless communication device associated with the end user and wherein assigning the backhaul method further comprises assigning the backhaul method corresponding to a service class which corresponds to the quality indication received from the wireless communication device.

18. The method of claim 17 wherein monitoring comprises receiving a request which defines a quality of connection requested by a wireless communication device associated with the end user and wherein assigning the backhaul method further comprises assigning the backhaul method corresponding to a service class which corresponds to the quality request from the wireless communication device.

* * * * *